June 17, 1930.  J. PONIATOWSKI  1,765,094
PARACHUTE ATTACHMENT FOR AEROPLANES
Filed Sept. 5, 1929  4 Sheets-Sheet 1
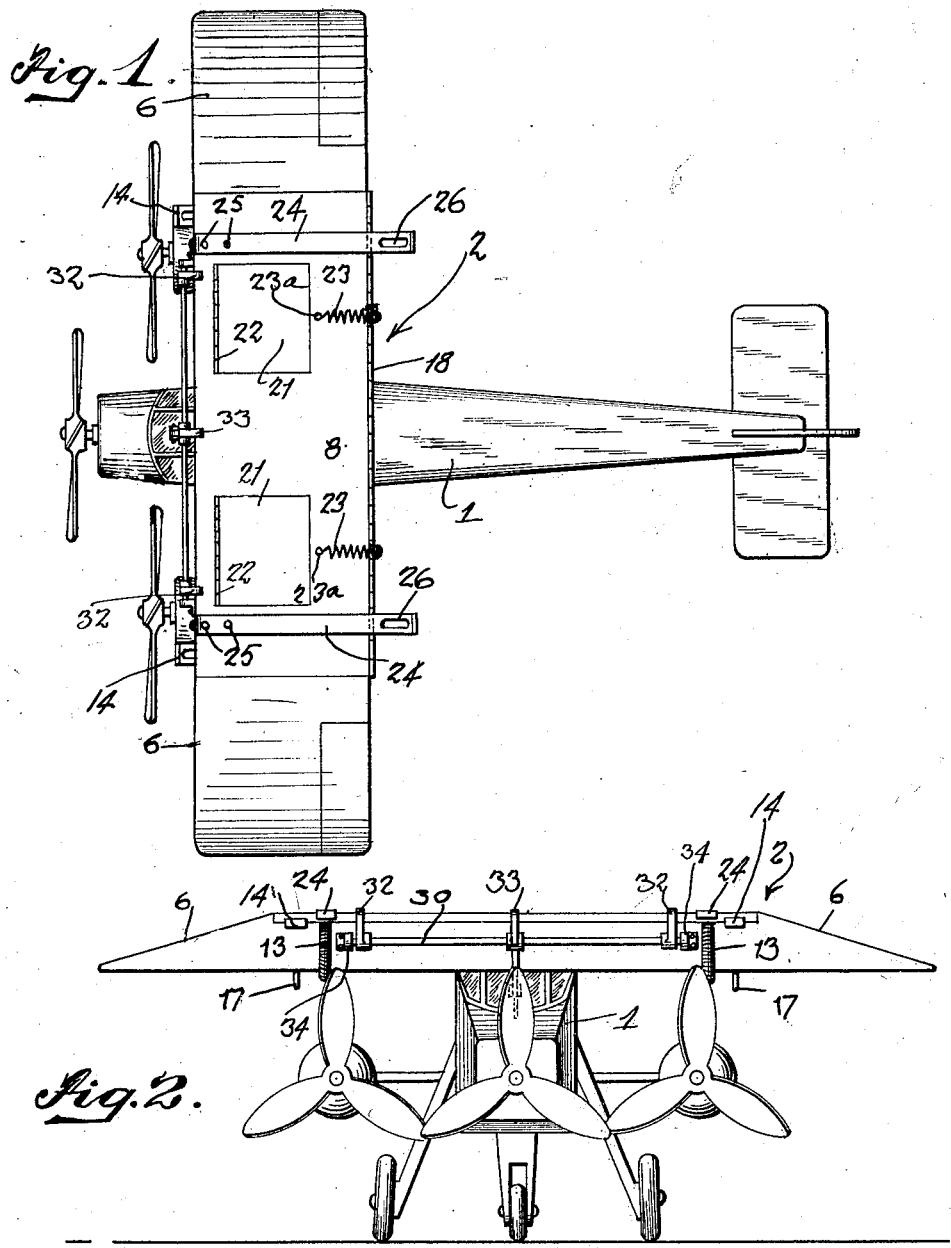
Inventor
Joseph Poniatowski.
By Bryant & Lowry
Attorneys June 17, 1930. J. PONIATOWSKI 1,765,094
PARACHUTE ATTACHMENT FOR AEROPLANES
Filed Sept. 5, 1929 4 Sheets-Sheet 2
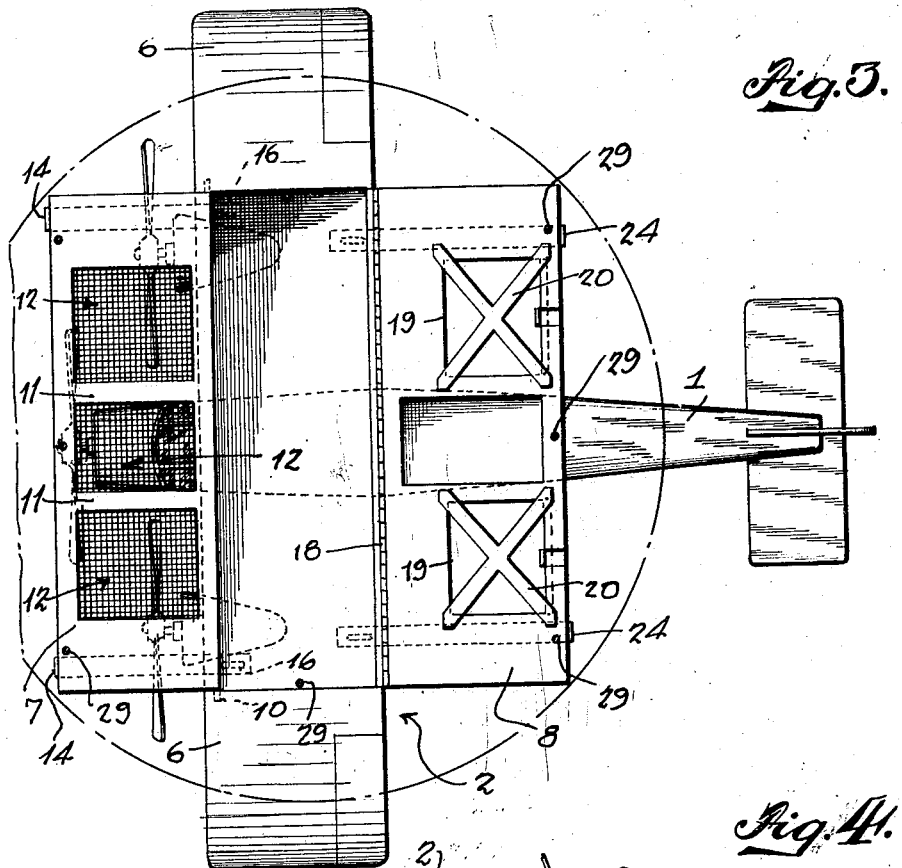
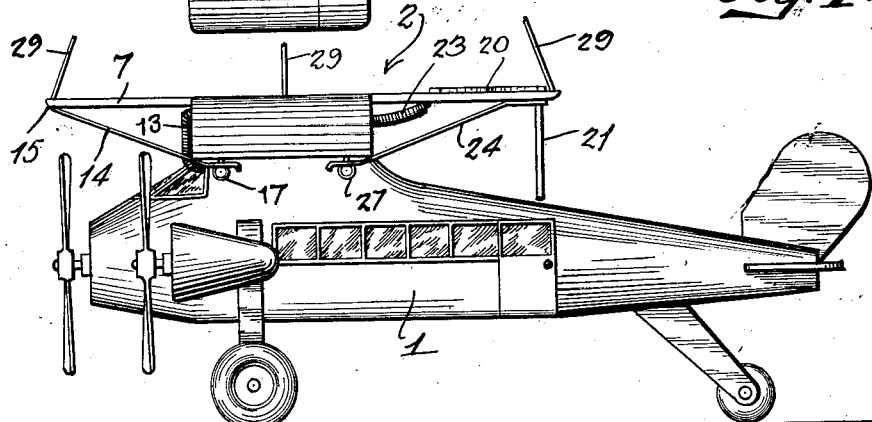
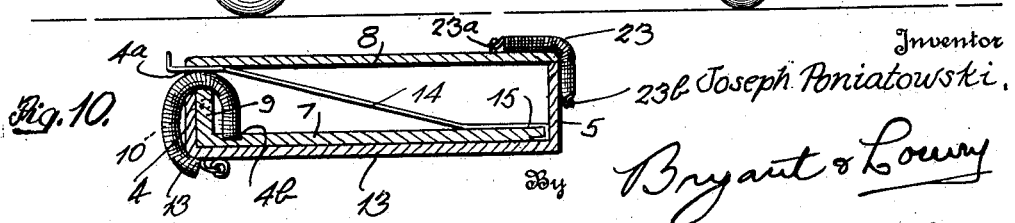
Inventor
Joseph Poniatowski,
By Bryant & Lowry
Attorneys

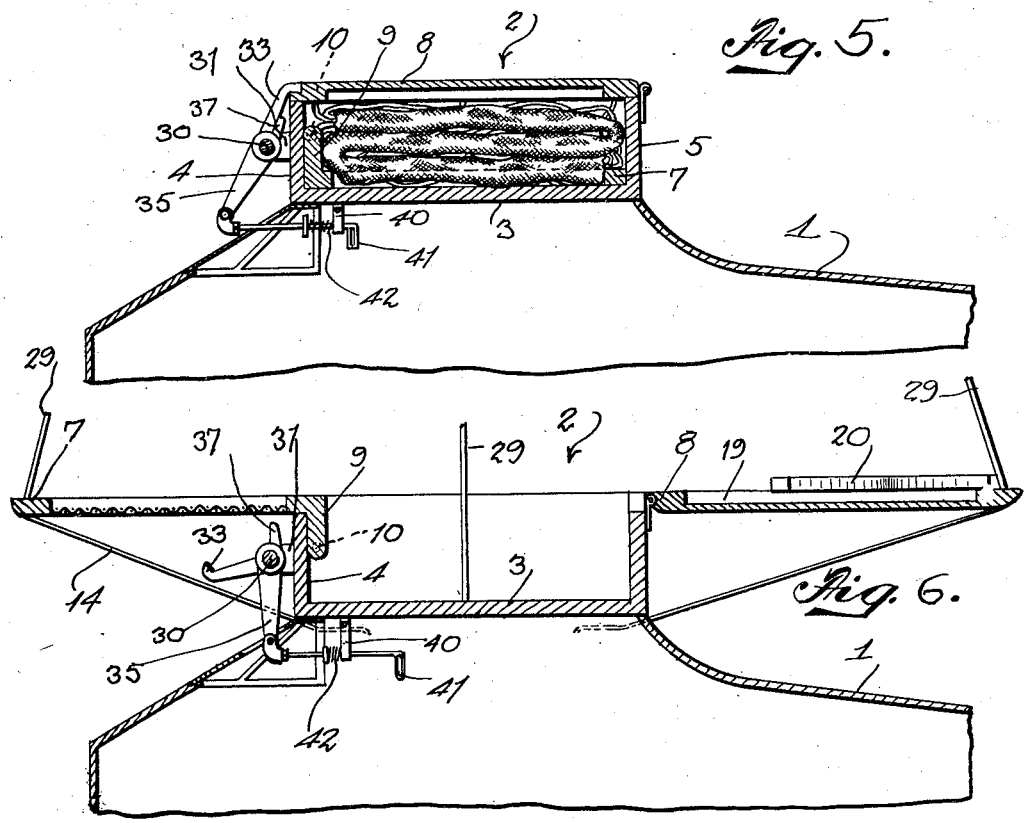
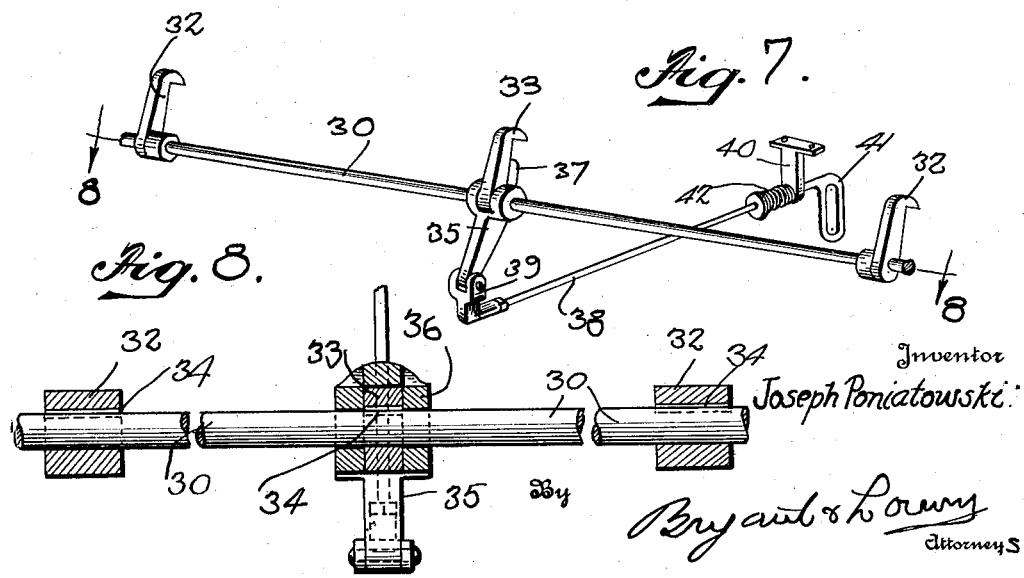

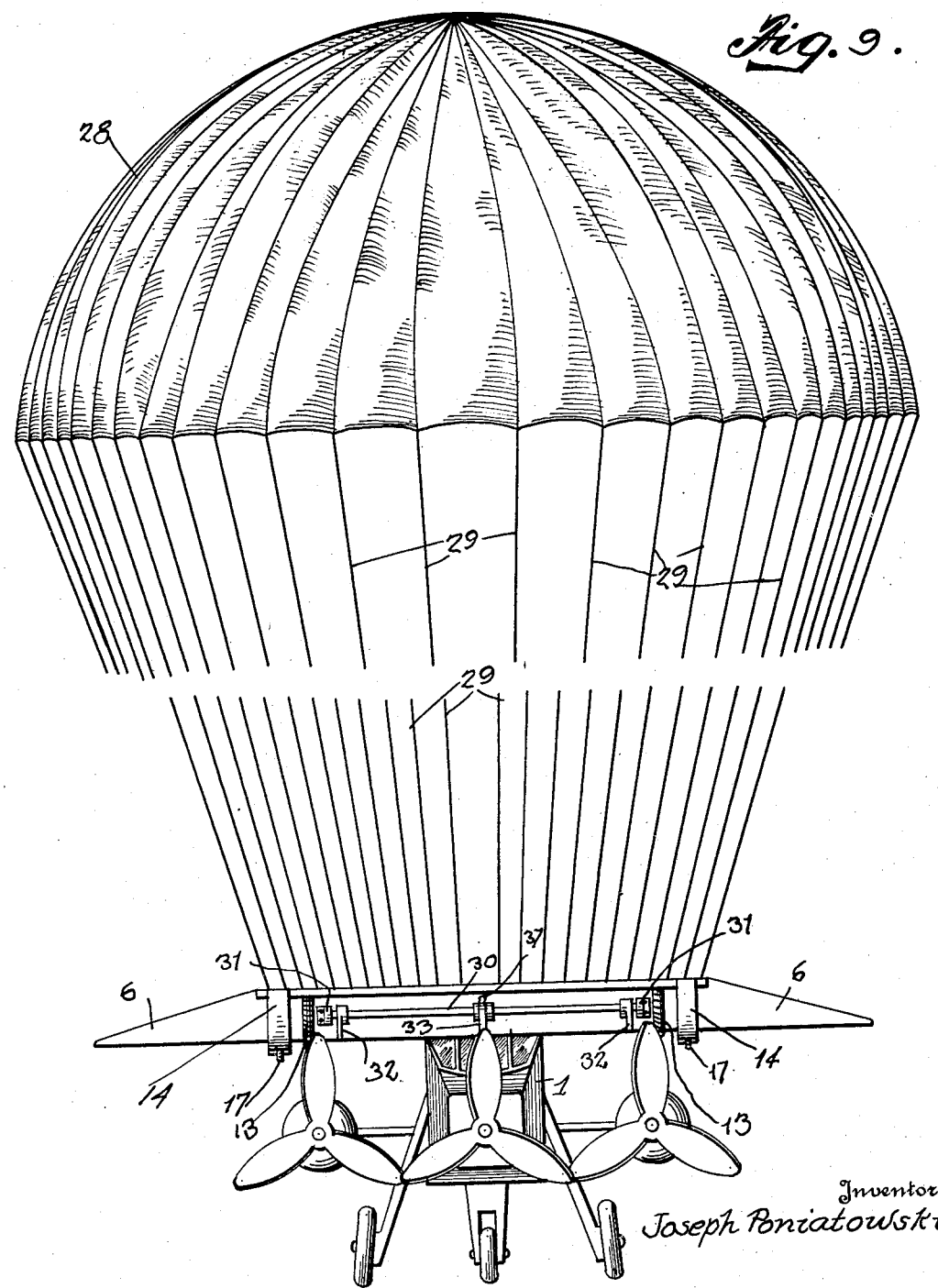

Patented June 17, 1930

1,765,094

UNITED STATES PATENT OFFICE

JOSEPH PONIATOWSKI, OF HUNTINGTON PARK, CALIFORNIA

PARACHUTE ATTACHMENT FOR AEROPLANES

Application filed September 5, 1929. Serial No. 390,499.

This invention relates to certain new and useful improvements in parachute attachments for aeroplanes.

The primary object of the invention is to provide a parachute attachment for aeroplanes in which the parachute is normally confined in a compact condition during flight of the aeroplane to be manually released to operative position in the event of an accident or the like to lessen the speed of descent of the aeroplane to the ground and insures safe landing thereof.

Another object of the invention is to provide a parachute attachment for aeroplanes wherein the sustaining wing of the aeroplane is of box-like or casing formation with a pair of overlapping cover walls at the upper side thereof with the parachute normally confined within the sustaining wing, with the lanyards of the parachute attached to the cover sections of the wing and to the bottom wall of the wing.

A still further object of the invention is to provide a parachute atachment for aeroplanes of the aforementioned type wherein the cover sections of the sustaining wing housing the parachute are equipped with latch devices automatically engaged with keeper plates on the lower side of the sustaining wing to rigidly support the cover sections in open position to provide for the proper expanse of the parachute, and sustaining the aeroplane.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a top plan view of an aeroplane with the sustaining wing thereof constructed in accordance with the present invention for housing a parachute;

Figure 2 is a front elevational view of the aeroplane;

Figure 3 is a top plan view showing the cover sections of the sustaining wing in open position, and illustrating by circular dot and dash lines the parachute;

Figure 4 is a side elevational view showing the latch devices for holding the cover sections of the sustaining wing in opened position and the parachute lanyard attached to the outer edges of the cover section and to the stationary portion of the sustaining wing;

Figure 5 is a fragmentary detail cross-sectional view showing the parachute confined within the sustaining wing and a latch device for holding the cover sections in closed position;

Figure 6 is a detail sectional view similar to Figure 5 showing the cover sections in their opened positions and so retained by latch devices;

Figure 7 is a perspective view of the latch mechanism for holding the cover sections in closed position;

Figure 8 is a longitudinal sectional view taken on line 8—8 of Figure 7;

Figure 9 is a front elevational view of the aeroplane with the parachute fully extended above in operative position; and Figure 10 is a detail sectional view through the wing showing the springs for automatically opening the cover wall sections of the wing.

Referring more in detail to the accompanying drawings, the parachute attachment for aeroplanes is illustrated as associated with a tri-motored monoplane, the reference numeral 1 designating the fuselage carrying the usual appurtenances such as rudders, ground wheels and skids and the usual motor operated propellers, there being disposed above the fuselage adjacent the forward end a cross-plane or wing 2.

The wing 2 is of hollow or casing formation and includes a bottom wall 3 and front and rear walls 4 and 5 with the end sections 6 of the top wall tapering toward the outer ends of the wing providing a stream line usually found in these parts of aeroplanes. The intermediate portion of the wing 2 between the end top wall sections 6 is provided with a pair of hinged cover walls 7 and hinged to the front and rear walls 4 and 5 respectively, the cover wall 7 when the two walls are in their folded positions as shown in Figs. 1 and 5. The cover wall 7 as shown in Figure 6 carries an edge flange 9 at the hinged side thereof with the hinged pintle 10 associated with the outer edge of the flange 9 and mounted substantially midway the upper and lower edges of the wing wall 4, whereby the cover wall 7 lies substantially in contact with the bottom wall 3 of the wing when in folded or closed position as shown in Figure 5. The cover wall 7 is provided with relatively large spaced openings defined by cross-bars 11 shown in Fig. 3 with a screen covering for the opening. A coil spring 13 is attached to each end of the upper side of the hinged wall 7 adjacent the edge flange 9 with the other ends thereof attached to the bottom wall 3 of the wing exteriorly thereof as shown in Figs. 2 and 4 to effect automatic opening of the cover wall 7 when released from confinement within the wing in a manner to be later described. The springs 13 are each anchored at one end as at 13 to the bottom wall 3 of the wing as shown in Fig. 10, and extends through a cut out 4ª in the forward wall 4 of the wing with the other end anchored as at 4ᵇ to the cover wall 7 adjacent the flanged edge 9 thereof. Means is provided for rigidly supporting the cover wall 7 when in open position as shown in Figure 6 and includes a spring arm 14 attached at one end as at 15 to the free swinging edge of the cover wall 7 with the other end thereof slotted as at 16 to receive the keeper 17 carried by the bottom wall 3 adjacent its forward edge.

The other cover wall 8 is hinged at one edge as at 18 to the upper edge of the rear wing wall 5 and when in closed position as shown in Figs. 1 and 5 forms a continuous upper wall for the wing. The cover wall 8 is provided with spaced openings 19 with cross rods 20 extending over the same while door sections 21 are hinged as at 22 to one side of the opening 21 at the upper side of the cover wall 8 to be gravitationally opened when the wall 8 is in the open position as shown in Figure 4. The cover wall 8 is opened by coil springs 23, each attached at one end to the upper side of the wall 8 as at 23ª with the other end anchored as at 23ᵇ to the rear wall 5 of the wing as shown in Figure 4. The spring arms 24 attached at one end as at 25 to the upper side of the free swinging edge of the cover wall 8 have the other free ends thereof slotted as at 26 to engage the keeper 27 upon the bottom wall 3 adjacent the rear wall 5 as shown in Figure 4, the spring arms 24 rigidly supporting the cover wall section 8 in open horizontal position.

A parachute body 28 illustrated in Figure 9 in its fully opened expanded condition is secured by a multiplicity of lanyards 29 to the sustaining wing 2, the lanyards being attached to the outer edges of the cover wall sections 7 and 8 as shown in Figure 6 and also to the bottom wall 3 of the sustaining wing 2, the parachute in folded condition is carried within the sustaining wing as shown in Figure 5. The cover wall 7 being first released from its locked position shown in Figure 6 by disengaging the spring arms 14 from the keepers 17 and being moved upon its hinged mounting 10 to occupy a position within the sustaining wing 2 in contact with the bottom wall 3 thereof, the springs 15 by this movement, being placed under tension. The parachute body 28 and lanyards 29 are then folded in any convenient manner and disposed within the sustaining wing 2 above the cover wall 7, after which, the cover wall 8 has the spring arms 24 carried thereby disengaged from the keeper 27 to permit closing movement thereof, the springs 23 during this operation being placed under tension, while the parachute assumes a position completely confined within the sustaining wing 2 as shown in Figure 5.

To retain the cover walls 7 and 8 in the closed position illustrated in Figure 5 against the tension of the springs 13 and 23, latch devices are provided and are associated with the free swinging edge of the cover wall 8.

As shown more clearly in Figures 7 and 8, the shaft 30 is journaled in bracket arms 31 projecting forwardly of the forward wall 4 of the sustaining wing 2 and has a plurality of dogs or latches 32 and 33 keyed thereto as at 34 that are moved into engagement with the free swinging edge of the cover wall 8 to retain the same in closed position. The operating mechanism for the dogs 32 and 33 includes a lever 35 having pivot bearings 36 journaled on the shaft 30 in enclosing relations with respect to the keyed end of the dog 33 with a finger 37 carried by the lever 35 to engage the dog 33 to operate said dog, the shaft 30 and the other two dogs 32 for moving the several dogs to releasing positions. An operating rod 38 is attached at one end as at 39 to the lower end of the operating lever 35 and extends into the fuselage 1 of the aeroplane to be supported in a bracket 40 depending from the bottom wall 3 of the sustaining wing 2, the inner end of the rod 38 being provided with an operating handle 41 while a coil spring 42 anchored at one end to the rod 38 and engaged with the bracket 40 tends normally to project forwardly the operating rod for holding the finger 37 in operative position relative to the cover retaining dog 33.

When the sustaining wing elements are in the positions shown in Figs. 1 and 5 and it is desired to release the parachute 28, the operating rod 38 is shifted by grasping the handle 41 to cause the finger 37 upon the operating lever 35 to move the dog 33, shaft 30 and dog 32 to positions spaced from the free swinging edge of the cover wall 8 as shown in Fig. 6 and at which time the coil springs 13 and 23 associated with the cover walls 7 and 8 respectively will effect automatic opening movement of the cover walls and liberation of the parachute 28. During the opening movement of the cover walls 7 and 8, the spring arms 14 and 24 will have their slotted ends engaged by the keepers 17 and 27 respectively for rigidly supporting the cover walls in open position, the doors 21 in the cover wall 8 gravitationally opening to permit upward flow of air through the opening 19, while air flows upwardly through the screened openings 12 in the cover wall 7, thus providing sufficient air supply for the parachute 28. The parachute body 28 moves to fully expansive form as illustrated in Fig. 9, a wide expanse thereof being afforded by having the lanyards 29 attached to the outer edges of the cover walls 7 and 8 which are rigidly supported in open positions, and also to the bottom wall 3 of the sustaining wing 2.

From the above detailed description of the invention, it is believed that the construction and operation thereof will at once be apparent, and while there is herein shown and described a preferred embodiment of the invention, it is nevertheless to be understood that minor changes may be made therein without departing from the spirit and scope of the invention as claimed.

I claim:—

1. In a parachute attachment for aeroplanes, a sustaining wing of hollow formation having cover wall sections hinged thereto, a parachute confined within the wing and attached to the wall sections and wing, means for automatically opening the cover wall sections to release the parachute, and manually operable means for retaining the cover walls in closed position.

2. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, and latch devices rendered operable during opening movement of the cover walls to hold them rigidly positioned when opened.

3. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, and said cover walls having openings therein to permit unobstructed flow of air to the parachute.

4. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, latch devices rendered operable during opening movement of the cover walls to hold them rigidly positioned when opened, and said cover walls having openings therein to permit unobstructed flow of air to the parachute.

5. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, said cover walls having openings therein to permit unobstructed flow of air to the parachute, and hinged cover for the openings in the upper cover wall gravitationally opening when the cover wall is opened.

6. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, latch devices rendered operable during opening movement of the cover walls to hold them rigidly positioned when opened, said cover walls having openings therein to permit unobstructed flow of air to the parachute, and hinged cover for the openings in the upper cover wall gravitationally opening when the cover wall is opened.

7. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, one of the cover walls being received in the sustaining wing with the folded parachute disposed thereon and the other cover wall when in closed position being flush with the upper wall of the sustaining wing.

8. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, latch devices rendered operable during opening movement of the cover walls to hold them rigidly positioned when opened, one of the cover walls being received in the sustaining wing with the folded parachute disposed thereon and the other cover wall when in closed position being flush with the upper wall of the sustaining wing.

9. In a parachute attachment for aeroplanes, a sustaining wing of hollow formation having cover wall sections hinged thereto, a parachute confined within the wing and attached to the wall sections and wing, means for automatically opening the cover wall sections to release the parachute, and manually operable means for retaining the cover walls in closed position, the means for automatically opening the cover walls including springs attached to the walls adjacent the hinged sides and to the sustaining wing.

10. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, and latch devices rendered operable during opening movement of the cover walls to hold them rigidly positioned when opened, the means for automatically opening the cover walls including springs attached to the walls adjacent the hinged sides and to the sustaining wing.

11. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, one of the cover walls being received in the sustaining wing with the folded parachute disposed thereon and the other cover wall when in closed position being flush with the upper wall of the sustaining wing, the means for automatically opening the cover walls including springs attached to the walls adjacent the hinged sides and to the sustaining wing.

12. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, latch devices rendered operable during opening movement of the cover walls to hold them rigidly positioned when opened, one of the cover walls being received in the sustaining wing with the folded parachute disposed thereon and the other cover wall when in closed position being flush with the upper wall of the sustaining wing, the means for automatically opening the cover walls including springs attached to the walls adjacent the hinged sides and to the sustaining wing.

13. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, the means for automatically opening the cover walls including springs attached to the walls adjacent the hinged sides and to the sustaining wing, and the retaining means for the cover walls including latch dogs pivoted on the wing engaged with the free edge of the upper cover wall.

14. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, latch devices rendered operable during opening movement of the cover walls to hold them rigidly positioned when opened, the means for automatically opening the cover walls including springs attached to the walls adjacent the hinged sides and to the sustaining wing, and the retaining means for the cover walls including latch dogs pivoted on the wing engaged with the free edge of the upper cover wall.

15. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, one of the cover walls being received in the sustaining wing with the folded parachute disposed thereon and the other cover wall when in closed position being flush with the upper wall of the sustaining wing, the means for automatically opening the cover walls including springs attached to the walls adjacent the hinged sides and to the sustaining wing, and the retaining means for the cover walls including latch dogs pivoted on the wing engaged with the free edge of the upper cover wall.

16. In a parachute attachment for aeroplanes, a sustaining wing of hollow formation having cover wall sections hinged thereto, a parachute confined within the wing and attached to the wall sections and wing, means for automatically opening the cover wall sections to release the parachute, manually operable means for retaining the cover walls in closed position, latch devices rendered operable during opening movement of the cover walls to hold them rigidly positioned when opened, one of the cover walls being received in the sustaining wing with the folded parachute disposed thereon and the other cover wall when in closed position being flush with the upper wall of the sustaining wing, the means for automatically opening the cover walls including springs attached to the walls adjacent the hinged sides and to the sustaining wing, and the retaining means for the cover walls including latch dogs pivoted on the wing engaged with the free edge of the upper cover wall.

17. In a parachute attachment for aeroplanes, a sustaining wing of hollow formation, a pair of cover walls hinged to opposite sides of the wing, one overlying the other and opening in opposite directions and a parachute having its lanyards attached to the free swinging edges of the cover walls and normally confined between the walls within the wing.

18. In a parachute attachment for aeroplanes, a sustaining wing of hollow formation, a pair of cover walls hinged to opposite sides of the wing, one overlying the other and opening in opposite directions and a parachute having its lanyards attached to the free swinging edges of the cover walls and normally confined between the walls within the wing, and manually operable retaining dogs engaged with the free edge of the upper cover wall for holding the cover walls in closed position.

19. In a parachute attachment for aeroplanes, a sustaining wing of hollow formation, a pair of cover walls hinged to opposite sides of the wing, one overlying the other and opening in opposite directions and a parachute having its lanyards attached to the free swinging edges of the cover walls and normally confined between the walls within the wing, manually operable retaining dogs engaged with the free edge of the upper cover wall for holding the cover walls in closed position, and coil springs associated with the sustaining wing and cover walls for automatically opening the cover walls when the dogs are manually released from the upper cover wall.

In testimony whereof I affix my signature.

JOSEPH PONIATOWSKI.